United States Patent [19]
Toepell

[11] 3,895,936
[45] July 22, 1975

[54] PROCESS FOR REDUCING IRON OXIDES IN ROTARY KILN

[76] Inventor: Hans D. Toepell, 4 Erinbrook Ct., Islington, Ontario, Canada

[22] Filed: Oct. 18, 1973

[21] Appl. No.: 407,592

[30] Foreign Application Priority Data
Oct. 20, 1972 United Kingdom............... 48381/72

[52] U.S. Cl....................................... 75/29; 75/36
[51] Int. Cl.²......................................... C21B 13/08
[58] Field of Search...................... 75/25, 33, 36, 29

[56] References Cited
UNITED STATES PATENTS

| | | | |
|---|---|---|---|
| 2,687,290 | 8/1954 | Garoutte et al................. | 75/25 UX |
| 2,823,108 | 2/1958 | Gerlach................................. | 75/33 |
| 3,753,682 | 8/1973 | Kohl..................................... | 75/36 |
| 3,831,913 | 8/1974 | Ando et al............................ | 75/36 |

*Primary Examiner*—L. Dewayne Rutledge
*Assistant Examiner*—M. J. Andrews

[57] ABSTRACT

A process and apparatus are provided for reducing iron-oxide bearing materials with reduced dust emission and reduced heat loss. The material and a reducing agent are mixed to form a charge which is fed into the kiln. As the charge travels through the kiln it passes through a heat transfer zone and then through a reduction zone. The heat transfer zone includes suspended chains or other such devices which are heated by gases leaving the reduction zone and which pass this heat to the charge. This heat transfer pre-heats the charge and cools the gases to reduce the volume and hence the speed of the gases thereby also reducing the weight of dust and particles picked up by the gases from the charge.

3 Claims, 3 Drawing Figures

PROCESS FOR REDUCING IRON OXIDES IN ROTARY KILN

This invention relates to a method and apparatus for use in reducing iron oxides.

According to existing practice, metallic iron is obtained from iron oxide bearing materials, such as $Fe_2O_3$, $Fe_3O_4$ etc., in a rotary kiln. These materials together with a carbon containing reducing agent form a charge which enters a feed end of the kiln. The reducing agent can be any suitable type of coal, i.e. anthracite or lignite. Upon the application of heat, a temperature is reached at which the volatiles in the coal are driven off. These volatiles combine with oxygen from the iron oxides at elevated temperatures and produce mainly carbon dioxide and metallic iron. The kiln is arranged so that the metallic iron leaves by a discharge end of the kiln, and the exhaust gases leave at the feed end of the kiln.

One of the problems with conventional processes is that the exhaust gases leaving the kiln are in a hot expanded state so that these gases must travel at relatively high velocities. As a result the gases tend to pick up particles from the charge particularly where the feed is of small particle size. Also, and more importantly, there is a substantial heat loss to the system.

It is also important that the kiln be of sufficient length to ensure that the charge reaches a temperature at which reduction takes place. In some instances attempts have been made to reduce the kiln length by pre-heating the iron oxide bearing materials and then feeding these materials into the kiln with the coal used for reduction. Because the coal can not be substantially pre-heated, the pre-heated iron oxide bearing materials cause sudden heating of the coal with resultant heat stresses in the coal. The coal will usually have some moisture in it and consequently the coal tends to break up violently. This increases the probability that particles will be picked up by the exhausting gases leaving the kiln with resultant difficulties in controlling the dust emission from the kiln. Further, although the pre-heating of the iron oxide bearing materials reduces the length of the kiln, the heat in the exhaust gases is lost from the kiln.

A further condition of present kiln design lies in the charge itself. The length of the kiln can be reduced if the iron oxide bearing material is of a controlled size because this ensures good thermal and physical contact with the coal for reduction purposes. If the material is fed into the kiln in a simple crushed form then the length of the kiln would have to be increased to ensure that the various sizes of material pieces were adequately reduced.

Among the objects of the present invention are to provide a method and apparatus for reducing iron oxide bearing materials in simple crushed form in a kiln of reduced length, to reduce the dust emission from the kiln, and to reduce heat lost from the process.

According to a particular preferred embodiment of the present invention, a process and apparatus are provided which substantially avoid these problems. The invention provides a rotary kiln which has a heat transfer zone and a reduction zone. The heat transfer zone is provided with suspended metallic chains or other movable surface-increasing devices. A charge, which consists essentially of iron oxide bearing materials together with a reducing agent, is fed into the kiln and then it passes through the heat transfer zone where the chains aid in transferring heat from hot gases to the charge. However the amount of air or oxygen present is controlled so that the reducing agent will merely char and will not burn the charge. Thus, the gases given off in this zone are primarily the volatiles driven from the reducing agent during the charring process. As the charge travels towards the reduction zone, more reducing agent is added followed by additional oxygen to heat the iron oxide bearing material sufficient to liberate the oxygen from this material and thereby reduce the oxides to iron while creating substantially burnt hot gases. The metallic iron leaves from a discharge end of the kiln while the hot gases leave the reduction zone and then pass through the heat transfer zone to heat the chains and hence the charge before exhausting through the feed end of the kiln. The heat transfer in the heat transfer zone cools the gases with a consequent reduction in their volume, and at the same time, the heat from the gases is retained in the system for use in the heating of the feed passing through the heat transfer zone.

The invention will be better understood with reference to the drawings in which.

Figure 1:
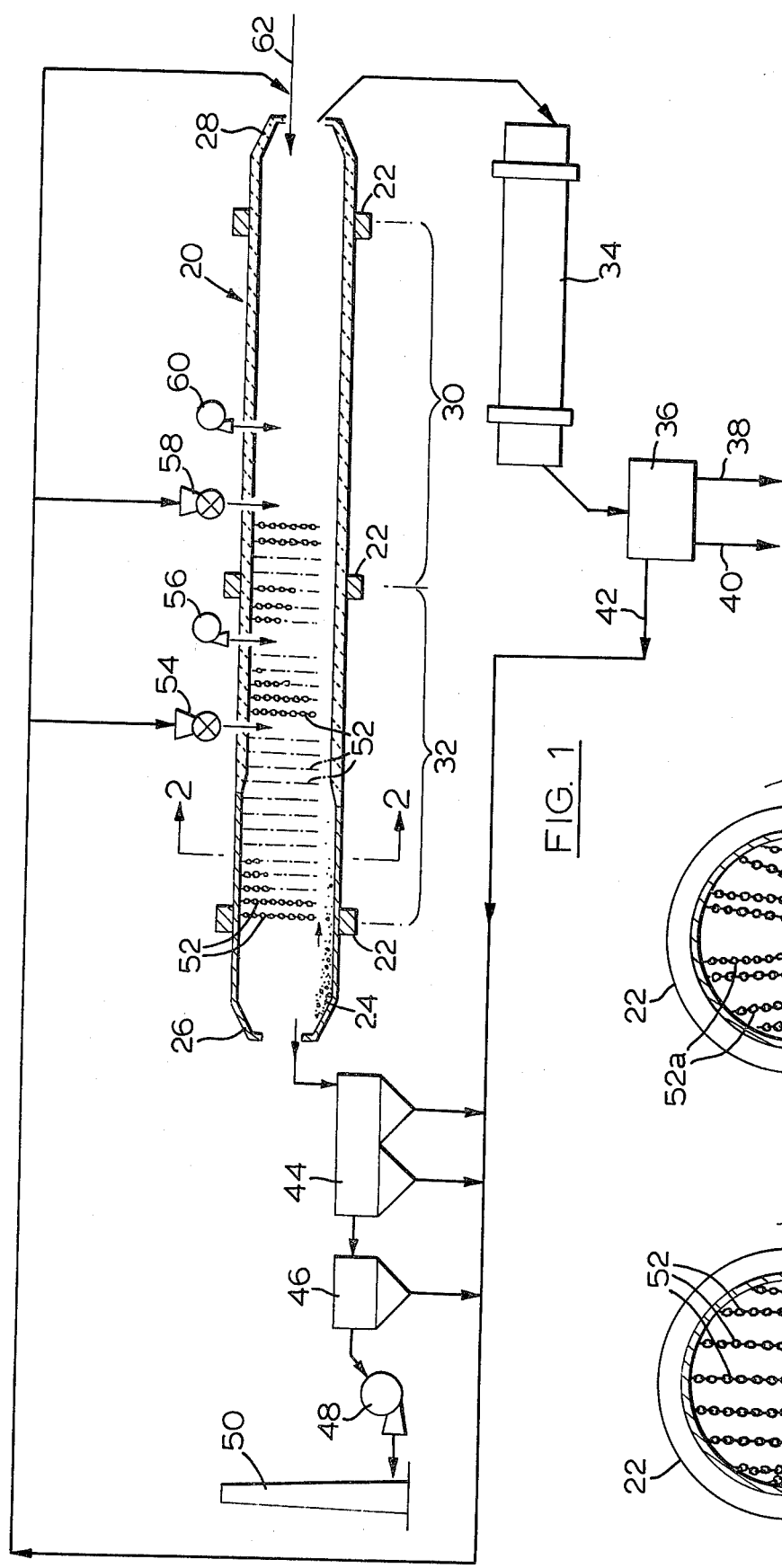
FIG. 1 is a diagrammatic view of apparatus according to the invention.

Reference is first made to FIG. 1 which shows a kiln 20 having rings 22 for engaging support rollers 23 (FIG. 2) which permit the kiln to rotate about its longitudinal axis. A charge 24 is fed into a feed end 26 of the kiln and after reduction, metallic iron and other remaining parts of the charge leave from a discharge end 28. Hot gases created in a reduction zone 30 move towards the feed end 26 and are used in a heat transfer zone 32 to heat the charge before the charge reaches the reduction zone 30.

Before describing the kiln in further detail, the ancillary equipment will be described. Discharge leaving the kiln 20 is fed to a cooling unit 34 from which the discharge travels to a magnetic separator 36 to separate the iron from the remainder of the solid discharge. Iron leaves by outlet 38, wastes by outlet 40 and re-usable material by outlet 42.

Turning now to the gases leaving the kiln, these gases carry particles from the charge. However because the gases have been cooled (as will be described) the velocity of the gases is limited so that the weight of particles carried by these gases is also limited. The gases are cleaned of particles by passing the gases through de-dusting units 44, 46. The resulting dust can then be fed into a line to meet the reusable portion of the discharge leaving separator 36 before being fed to the kiln as will be described. Gases leaving the unit 46 pass through fan 48 and thence up a chimney 50.

Figure 3:
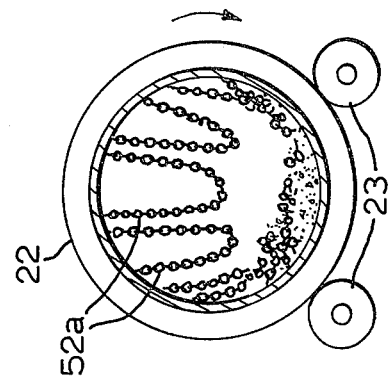
FIG. 3 is a view similar to FIG. 2 showing an alternative arrangement of chains.
Figure 2:
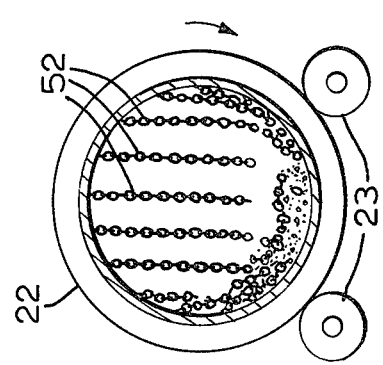
FIG. 2 is a sectional view on line 2—2 of FIG. 1 and showing chains in a heat transfer zone.

Consider now a portion of the charge 24 finding its way into the heat transfer zone 32. The charge begins to be heated and as the charge progresses it comes into contact with chains 52 attached to the wall of the kiln. The chains may be suspended in any suitable manner either from one end of each chain as seen in FIGS. 1 and 2 or with both ends attached to the wall as indicated at 52a in FIG. 3. These chains pick up heat from hot gases travelling towards the feed end 26 of the kiln and then transfer this heat to the charge. Initially the heat causes the coal to give off moisture and some gases, and also causes the charge to compact and become more granular. The hot gases do not include sufficient oxygen to permit the reducing agent to burn. Consequently the heat transfer zone allows the charge to heat adequately without substantially burning ready for reduction. Re-usable charge is then added at inlet 54 and air is fed into inlet 56 to commence the reduction process. More re-usable material can be added at inlet 58 and air at inlet 60 to give more control over the initial stages of the reduction process. Most of the reduction takes place in zone 30 where the coal is burned using air entering through discharge end 28. The heat created results in oxygen leaving the iron oxide to produce iron. After reduction, the charge leaves to go to the cooling unit 34 and the hot gases leave the feed end as previously described.

The re-usable material can also be fed into the discharge end 28 and past a pilot burner 62 which can be used continuously as well as to start up the reduction process in the kiln.

The present method and apparatus enable iron reduction to take place in a relatively short kiln where under controlled conditions the exhaust gases are cooled so that their volume is relatively small. Consequently the velocity of the exhaust gases leaving the feed end is reduced thereby also reducing the weight of particles picked up by these gases as they pass over the charge. Further the charge can be of any type including simple crushed iron oxide bearing material and a reducing agent.

What I claim is:

1. In a process for reducing iron oxide bearing materials of a type comprising the steps: mixing said materials with reducing agent having volatiles to prepare a kiln charge; entering the kiln charge into a charge end of a kiln; causing combustion to reduce the iron oxide; and allowing the products of combustion to exit through the charge end of the kiln, the improvement in which the kiln is provided with a heat transfer zone and a reduction zone, and in which oxygen is fed into the kiln adjacent an interface between the reduction zone and the heat transfer zone to support the last of the combustion in the reduction zone, the oxygen supply being adjustably controlled to effectively confine combustion to the reduction zone so that the products of combustion passing through the heat transfer zone have substantially no oxygen thereby preventing combustion in the heat transfer zone, and in which the heat transfer zone is provided with heat transfer elements to enhance heat transfer from the products of combustion to the charge for driving off volatiles and moisture from the charge before reduction.

2. A process as claimed in claim 1 in which the charge is enriched with further reducing agent after heating by said products of combustion in the heat transfer zone.

3. A process as claimed in claim 2 in which the further reducing agent is re-usable materials reclaimed from the reduction process.

* * * * *